United States Patent [19]
Schulze et al.

[11] 4,113,697
[45] Sep. 12, 1978

[54] POLYETHER DIAMIDE EPOXY ADDITIVES

[75] Inventors: Heinz Schulze; Harold G. Waddill, both of Austin, Tex.

[73] Assignee: Texaco Development Corporation, New York, N.Y.

[21] Appl. No.: 743,818

[22] Filed: Nov. 22, 1976

[51] Int. Cl.$^2$ ............................................. C08G 59/46
[52] U.S. Cl. ...................... 528/94; 260/561; 528/113; 260/830 P
[58] Field of Search ......... 260/47 EC, 59 EP, 78.41, 260/561 R, 2 EC, 830 TW

[56] References Cited

U.S. PATENT DOCUMENTS

| | | | |
|---|---|---|---|
| 3,324,176 | 6/1967 | Kirschnek et al. | 260/553 |
| 3,335,105 | 8/1967 | Burnthall et al. | 260/29.2 |
| 3,436,359 | 4/1969 | Hubin et al. | 260/2 |
| 3,462,393 | 8/1969 | Legler | 260/47 |
| 3,496,138 | 2/1970 | Sellers et al. | 260/47 |
| 3,557,056 | 1/1971 | Peerman | 260/47 |
| 3,580,887 | 5/1971 | Hubin | 260/47 |

*Primary Examiner*—Harold D. Anderson
*Assistant Examiner*—E. A. Nielsen
*Attorney, Agent, or Firm*—Carl G. Ries; Thomas H. Whaley; Kenneth R. Priem

[57] ABSTRACT

Resistance to thermal shock of certain anhydride cured epoxy resins is unexpectedly enhanced by addition of certain polyether diamide additives. This superior resistance does not appreciably compromise heat deflection properties. The resins comprise a vicinal polyepoxide, a curing amount of certain bicyclic anhydride and an effective amount of a polyether diamide having terminal amido groups and a molecular weight of from about 2000 to about 3000.

14 Claims, No Drawings

POLYETHER DIAMIDE EPOXY ADDITIVES

BACKGROUND OF THE INVENTION

1. Field of the Invention

This invention relates to curable epoxy resins having increased thermal shock resistance; and, more particularly, to certain anhydride cured epoxy resins containing certain polyether diamide additives.

2. Prior Art

Epoxy resins constitute a broad class of polymeric materials having a wide range of physical characteristics. The resins are characterized by epoxide groups which are cured by reaction with certain catalysts or curing agents to provide cured epoxy resin compositions with certain desirable properties. One such class of curing agents is generally the anhydrides. The most commonly used anhydride curing agents are difunctional materials such as maleic anhydride, phthalic anhydride and the like, as well as tetrafunctional materials such as pyromellitic dianhydride.

It is known to use polyamides as epoxy curing agents. Simple amides such as acetamide, benzamide and adipamide have been used, but low activity and/or solubility require use of basic catalysts. The advantages and disadvantages of polyamides as curing agents is discussed in Lee, Henry and Neville, K. *Handbook of Epoxy Resins*, McGraw Hill Book Co., New York, 1967. but, generally, the hydrogen of the primary or secondary amides is weakly reactive with epoxy groups.

Epoxy resins for casting, embedding or encapsulating etc. must withstand repeated cycles of high and low temperatures without cracking. However, lowering the temperature increases stress due to shrinkage and reduces the ability of the resin to flow, thus relieving the stress.

Anhydride cured resins are useful in applications where high heat deflection is required. However, such materials exhibit brittleness and thus a low resistance to thermal shock. Diluents and modifiers do improve thermal shock resistance properties but, unfortunately, adversely influence the heat deflection properties as shown in May and Tanaka, *Epoxy Resins*, New York, 1973, p. 299. Likewise, plasticizers have not found wide acceptance in epoxy technology primarily because most of them are incompatible with the cured resins.

It has now been unexpectedly found that a specific diamide terminated polyoxyalkylene material having a molecular weight of from about 2000 to about 3000, when employed as an epoxy additive, provides cured epoxy resin compositions exhibiting outstanding thermal shock resistance. Specifically, epoxy resins incorporating these additives, upon curing with a specific alkyl substituted bicyclic vicinal anhydride curing agent, provide a material with high heat deflection and superior resistance to thermal shock.

SUMMARY OF THE INVENTION

According to the broad aspect of the instant invention, the thermal shock resistance of an epoxy resin cured with an alkyl substituted bicyclic vicinal anhydride is enhanced by the addition of an effective amount of a polyether diamide having terminal amido groups and having a molecular weight of from 2000 to about 3000.

In one aspect, a curable epoxy resin composition having superior thermal shock resistance comprises a vicinal polyepoxide, a curing amount of an alkyl bicyclic [2,2,1] heptene, vicinal anhydride curing agent and an effective amount of the polyether diamide additive.

In accordance with a preferred embodiment, a diglycidyl ether of 4,4'-isopropylidene bisphenol, a curing amount of a methyl-bicyclic [2,2,1] heptene-2,3-dicarboxylic anhydride curing agent, a dimethylaminomethyl substituted phenol accelerator and an effective amount of a polyether diamide having terminal ureido groups and a molecular weight of about 2000 are utilized to form a resin.

DETAILED DESCRIPTION OF THE INVENTION

According to the instant inventive concept, blends of a polyepoxide, a specific anhydride curing agent and the diamido terminated polyether containing compounds and, optionally, an accelerator are thoroughly admixed and cured in accordance with conventional methods to provide cured epoxy resins having unexpectedly superior thermal shock resistance while maintaining desirable heat deflection properties.

Generally the vicinal polyepoxide containing compositions which are amine cured are organic materials having an average of at least 1.8 reactive 1,2-epoxy groups per molecule. These polyepoxide materials can be monomeric or polymeric, saturated or unsaturated, aliphatic, cycloaliphatic, aromatic or heterocyclic, and may be substituted if desired with other substituents besides the epoxy groups, e.g., hydroxyl groups, ether radicals, aromatic halogen atoms and the like.

Preferred polyepoxides are those of glycidyl ethers prepared by epoxidizing the corresponding allyl ethers or reacting, by known procedures, a molar excess of epichlorohydrin and an aromatic polyhydroxy compound, i.e., isopropylidene bisphenol, novolac, resorcinol, etc. The epoxy derivatives of methylene or isopropylidene bisphenols are especially preferred.

A widely used class of polyepoxides which is useful according to the instant invention includes the resinous epoxy polyethers obtained by reacting an epihalohydrin, such as epichlorohydrin, and the like, with either a polyhydric phenol or a polyhydric alcohol. An illustrative, but by no means exhaustive, listing of suitable dihydric phenols includes 4,4'-isopropylidene bisphenol, 2,4'-dihydroxydiphenylethylmethane, 3,3'-dihydroxydiphenyldiethylmethane, 3,4'-dihydroxydiphenylmethylpropylmethane, 2,3'-dihydroxydiphenylethylphenylmethane, 4,4'-dihydroxydiphenylpropylphenylmethane, 4,4'-dihydroxydiphenylbutylphenylmethane, 2,2'-dihydroxydiphenylditolylmethane, 4,4'-dihydroxydiphenyltolylmethylmethane and the like. Other polyhydric phenols which may also be co-reacted with an epihalohydrin to provide these epoxy polyethers are such compounds as resorcinol, hydroquinone, substituted hydroquinones, e.g., methylhydroquinone, and the like.

Among the polyhydric alcohols which can be co-reacted with an epihalohydrin to provide these resinous epoxy polyethers are such compounds as ethylene glycol, propylene glycols, butylene glycols, pentane diols, bis (4-hydroxycyclohexyl)dimethylmethane, 1,4-dimethylolbenzene, glycerol, 1,2,6-hexanetriol, trimethylolpropane, mannitol, sorbitol, erythritol, pentaerythritol, their dimers, trimers and higher polymers, e.g., polyethylene glycols, polypropylene glycols, triglycerol, dipentaerythritol and the like, polyallyl alcohol, polyhydric thioethers, such as 2,2'-, 3,3'-tetrahydroxydipropylsulfide and the like, mercapto alcohols such as monothioglycerol, dithioglycerol, and the like, polyhydric alcohol partial esters, such as monosterin, pentaerythritol monoacetate, and the like, and halogenated polyhydric alcohols such as the monochlorohydrins of glycerol, sorbitol, pentaerythritol and the like.

Another class of polymeric polyepoxides which can be anhydride cured and are in accordance with the instant invention includes the epoxy novolac resins obtained by reacting, preferably in the presence of a basic catalyst, e.g., sodium or potassium hydroxide, an epihalohydrin, such as epichlorohydrin, with the resinous condensate of an aldehyde, e.g., formaldehyde, and either a monohydric phenol, e.g., phenol itself, or a polyhydric phenol. Further details concerning the nature and preparation of these epoxy novolac resins can be obtained in Lee, H. and Neville, K., *Handbook of Epoxy Resins*, McGraw Hill Book Co., New York, 1967.

It will be appreciated by those skilled in the art that the polyepoxide compositions which are useful according to the practice of the present invention are not limited to those containing the above described polyepoxides, but that these polyepoxides are to be considered merely as being representative of the class of polyepoxides as a whole.

The anhydride curing agents which can be utilized in accordance with the instant invention are generally the alkyl substituted bicyclic vicinal anhydrides. A preferred class is the Diels-Alder adduct of maleic anhydride and cyclopentadiene. Exemplary compounds generally have the formula:

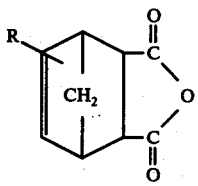

wherein R is a lower alkyl and more preferably a lower alkyl of from 1 to 4 carbon atoms. Preferred lower alkyl groups include methyl, ethyl, propyl, and n-butyl. The most preferred alkyl is methyl. The most preferred anhydride is methyl-bicyclo [2,2,1] heptene-2,3-dicarboxylic anhydride.

The polyether diamide additive can generally be described as polyoxyalkyl containing materials having terminal amido groups and a molecular weight of from about 2000 to about 3000. More specifically, these compounds are polyoxyalkylene compounds having terminal amido groups, of the formula:

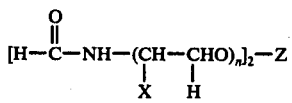

wherein X is hydrogen, a methyl radical or an ethyl radical; Z is a hydrocarbon alkylene radical having 2 to 5 carbon atoms and $n$ is an average number selected such that the molecule of the above formula has a molecular weight of from about 2000 to about 3000. The preferred diamides are of the above formula wherein X is a methyl radical; Z is a 1,2-propylene radical; and $n$ is an average number from 16 to 19. Preferred lower alkyl groups include methyl, ethyl, n-propyl and n-butyl.

The polyether diamide compounds are formed by the reaction of an amido forming compound with a polyoxyalkylene diamine having a molecular weight of from about 2000 to about 3000 at temperatures in the range from about 25° to about 150° C in a molar ratio of about 2 moles of amido forming compound for each mole of diamine. There are many known methods for forming such compounds by acylation of the amine reactant.

The diamines that are useful in forming the additives are polyoxyalkylene diamines of the formula:

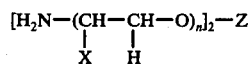

wherein X is a hydrogen, a methyl radical or an ethyl radical; Z is a hydrocarbon alkylene radical having from 2 to 5 carbon atoms; and, $n$ is an average number from 15 to about 25. Preferred are polyoxypropylene diamines wherein X is a methyl radical, $n$ is an average number from 16 to 19, Z is a 1,2-propylene radical. These polyoxyalkylene polyamines can be prepared by known methods as disclosed in U.S. Pat. Nos. 3,236,895 and 3,654,370.

The amide forming compounds are generally those which supply the acyl

radical. Suitable such compounds include formic acids, the acid chlorides, the esters and the like. Acylation reactions that can be utilized are well known and will not be further herein discussed.

In accordance with these known methods, the reactants are simply admixed in correct molar ratios in a suitable reaction vessel and heated until the reaction occurs.

The functionality of the polyoxyalkylenepolyamine is dependent upon the number of terminal primary amino groups, which, in the instant case, is 2. It will be realized that each mole of amido forming compound will react with a single terminal primary amino group of the polyoxyalkylenepolyamine. It is particularly important that, in forming the additive compounds of the instant invention, a specific molar ratio of reactants be maintained. Specifically, about 1 mole of amido forming compound for each amino group of the polyoxyalkylenepolyamine is required. Thus, with the diamine, about 2 moles of amido forming compound is utilized. Preferably the instant reaction is carried out in the presence of a slight excess of amido forming compound to assure complete conversion of the amino groups.

Optionally, the epoxy resin formulations of the instant invention can include an "accelerator" to speed the anhydride cure of the epoxy resin, especially at ambient temperatures. In several applications, such acceleration is beneficial, especially when an epoxy resin is used as an adhesive in flammable environment, thus making elevated temperature cure inconvenient or even hazardous. Lee, H. and Neville, K., *Handbook of Epoxy Resins*, pp. 7-14 describes the use of certain amine-containing compounds as epoxy curing agent-accelerators.

Many accelerators are known in the art which can be utilized; for, example tertiary amines such as those disclosed in U.S. Pat. No. 2,839,480. Preferred accelerators in accordance with the instant invention are the dialkyl amine substituted aromatics; and, preferably the dimethyl amino methyl substituted phenols.

According to the method of the instant invention, the thermal shock resistant properties of certain prior art anhydride cured epoxy resins are enhanced by the addition of an effective amount of a polyether diamide having terminal amido groups and a molecular weight of from about 2000 to about 3000 as hereinbefore described. The amount of additive effective in bringing about the increased adhesive property is somewhat empirical and will depend upon the resin, and the use of an accelerator. Generally, the diamido additive can be utilized in amounts from about 5 to about 35 parts by weight based on one hundred parts by weight of the resin constituent, with about 10 to about 20 parts by weight being preferred.

Although somewhat empirical, the exact amount of additive which is effective to increase the thermal shock resistance can readily be determined without undue experimentation owing to the fact that a resin mixture containing an effective amount of the additive will undergo changes which are readily visible as curing proceeds. Specifically, the curing resin takes on an opaque, milky white appearance that becomes more pronounced during curing and results in a product which has a lustrous white appearance. It will be realized that, advantageously, this optical absorption shift enhances the beauty of cast objects and negates the need to use white pigments or fillers.

Preferably the thermal shock resistant properties of prior art resins are enhanced by addition of an effective amount of the polyoxypropylene diamide additive based upon the condensation of 2 moles formic acid with about 1 mole of a polyoxypropylenediamine have a molecular weight of 2000. The preferred resins comprise polyglycidyl ethers of a polyhydric phenols cured by incorporating therein a curing amount of methyl bicyclo [2,2,1] heptene-2,3-dicarboxylic anhydride and a dimethylamino methyl substituted phenol accelerator.

The curable epoxy resin compositions of the instant invention generally comprise a vicinal polyepoxide, a curing amount of the anhydride curing agent and an effective amount of the polyether diamide additive. Optionally an accelerator can be added.

The anhydride cured resins having superior thermal shock resistance, without substantial deterioration of favorable heat deflection values, in accordance with the instant invention, are prepared in a conventional manner. The anhydride curing agent is admixed with the polyepoxide composition in amounts according to the functional carboxyl equivalent weight of the curing agent employed. Generally the number of equivalents of carboxyl groups is from about 0.8 to about 1.2 times the number of epoxide equivalents present in the curable epoxy resin composition, with from 0.8 to a stoichiometric amount being preferred. When using an accelerator, amounts from 1 to about 5 parts by weight based on 100 parts by weight of the resin are generally satisfactory. The exact amount of constituents in accordance with the above general requirements will depend primarily on the application for which the cured resin is intended.

The diamido additive is incorporated into the uncured resin by admixing. Preferably, the additive is first admixed with the curing agent and/or the accelerator prior to addition to the resin. The constituents forming the curable material are then intimately admixed by standard methods and degassed in the presence of a commercial defoamer and minute amounts of silicone oils to prevent voids and bubbles.

Although all of the epoxy resins disclosed herein are generally useful in accordance with the instant inventive concept, those based on aliphatic compounds are preferably not used exclusively. The presence of resins containing polyglycidyl ethers of polyhydric phenols in amounts greater than 50% by weight of the resin constituent, and more preferably 80% by weight and more preferably 100% by weight has been shown to greatly enhance the desirable properties of the cured material.

In accordance with a preferred embodiment, a curable resin comprises a diglycidyl ether of 4,4'-iso propylidene bisphenol; a curing amount of an anhydride curing agent consisting essentially of methyl bicyclo [2,2,1] heptene 2,3-dicarboxylic anhydride, an accelerator of dimethylaminomethyl substituted phenol; and, an effective amount of a polyether diamide having terminal amido groups and a molecular weight of about 2000. According to a greatly preferred embodiment, from about 80 to about 90 parts by weight of curing agent is used per 100 parts of resin.

A preferred ratio of constituents comprises from about 1 to about 5 parts by weight of accelerator; from 80 to 90 parts by weight anhydride curing agent; and from 5 to 50 parts by weight additive wherein all of the above amount are based on 100 parts by weight of the resin.

Generally, the mixture of epoxy resin, the polyether diamide, anhydride curing agent, and the accelerator is allowed to self-cure at elevated temperatures of up to 200° C. Curing temperatures in the range of 100° to 190° C are preferred with 135° to 170° C being most preferred.

According to a greatly preferred embodiment, resins of the polyglycidyl ether of polyhydric phenol type are cured by incorporating therein from about 80 to 90 parts by weight of methyl bicyclo [2,2,1] heptene-2,3-dicarboxylic anhydride; from about 5 to 40 parts by weight of the polyether diamido terminated polyoxyalkylenepolyamine having a molecular weight of about 2000; and from 1 to 5 parts by weight of an accelerator consisting essentially of dimethylaminomethyl substituted phenol. The composition is cured at temperatures from about 120° to 190° C to produce products having superior thermal shock resistance in accordance with the instant invention.

It will further be realized that various conveniently employed additives can be admixed with the polyepoxide containing composition of the instant invention prior to final cure. For example, in certain instances it may be desired to add minor amounts of other anhydride cocatalysts. Additionally, conventional pigments, dyes, fillers, flame retarding agents and the like which are compatible, natural or synthetic resins can be added.

Furthermore, although not preferred, known solvents for polyepoxide materials such as toluene, benzene, xylene, dioxane, ethylene glycol monomethyl-ether and the like can be used. The polyepoxide resins containing the additives of the instant invention can be used in any of the above applications for which polyepoxides are customarily used.

One outstanding feature of the instant composition resides in the fact that they are opaque upon curing and give a smooth, white lustrous surface which may be of particular benefit for certain molding and casting operations. The compositions of the instant invention can be used as impregnants, surface coatings, pottings, capsulating compositions, laminants, and, particularly and most importantly, as adhesives for bonding metallic elements or structures permanently together.

The following examples illustrate the nature of the instant invention but are not intended to be limitative thereof.

EXAMPLE I

In this example a polyether diamido terminated additive for use in accordance with the instant invention, was prepared. Into a suitable reaction vessel, equipped with stirring apparatus, thermometer, reflux condenser, and Dean Stark trap were added 971 grams (0.5 mole) of a polyoxypropylenepolyamine having a molecular weight of approximately 2000, and an analysis of 1.03 milliequivalents (meq.) primary amine/g sold under the tradename "JEFFAMINE® D-2000" by Jefferson Chemical Co., Austin, Tex. 78751, 76.5 g (1.5 moles) 90% by weight aqueous formic acid, and 200 ml toluene flushed with nitrogen and stirred under a nitrogen pad for 2 hours at reflux. An aqueous phase was separated in the Dean Stark trap. The crude reaction residue was then stripped in a rotary evaporator at 97° C/0.4 mm Hg to produce a viscous residue which upon analysis showed 1.64% N, 0.07 meq. total amine/g.

To illustrate the advantage of the polyether diamide additives of this invention, various epoxy formulations employing diglycidyl ether of 4,4'-isopropylidene bisphenol were cured with various known polyamine curing agents. Where indicated, a commercial accelerator was utilized. Three drops of silicone fluid were added to each formulation to prevent formation of voids and bubbles. After degassing under vacuum, the formulations were cured under the conditions indicated. In appropriate examples, the cured products were subjected to standard American Society for Testing Materials (ASTM) tests for IZOD impact strength (ASTM designation D-256), flexural strength and modulus of elasticity in flexure (ASTM DESIGNATION D-790-66), tensile strength and elongation at break (ASTM designation D-648-56) and hardness (ASTM designation 2240-64 T) and/or hardness Shore D. The abbreviations in the tables, pbw, psi and g, stand for parts by weight, pounds per square inch and grams, respectively.

EXAMPLES II-IV

In these examples epoxy resins were prepared wherein diglycidyl ether of 4,4'-isopropylidene bisphenol was cured with a methyl-bicyclo [2,2,1] heptene-2,3-dicarboxylic anhydride, and a dimethylaminomethyl substituted phenol accelerator to which were added the indicated amounts of the amide prepared in Example I. The resulting resins were used to pour ⅛ inch panels and the resultant subjected to the ASTM tests herein described. The data, which is for comparative purposes only, is presented in the following Table I.

TABLE I

| Formulations | Examples 2 | 3 | 4 |
|---|---|---|---|
| Epoxide, pbw (Eg. 190) | 100 | 100 | 100 |
| Curing agent, pbw[1] | 85 | 85 | 85 |
| Accelerator, pbw[2] | 2.5 | 2.5 | 2.5 |
| Bisamide[3] | 0 | 10 | 20 |
| Properties of cured 1/8" panels[4] | | | |
| IZOD impact strength, ft./lbs/in | 0.22 | 0.28 | 0.30 |
| Tensile strength, psi | 6500 | 12100 | 10100 |

TABLE I-continued

| Formulations | Examples 2 | 3 | 4 |
|---|---|---|---|
| Tensile modulus, psi | 419000 | 454000 | 358000 |
| Elongation at break, % | 1.6 | 4.0 | 4.5 |
| Flexural strength, psi | 17200 | 18000 | 15000 |
| Flexural modulus, psi | 487500 | 439000 | 375000 |
| HDT, ° C, 264 psi/66 psi | 122/130 | 114/123 | 111/120 |
| Shore D hardness, 0–100 sec. | 89–87 | 87–85 | 87–85 |

[1]"Nadic methyl anhydride" sold by Allied Chemical Corporation, Morristown, N. J. 07960
[2]"DMP-10" sold by Rohm and Haas, Philadelphia, Pa. 19105
[3]Product of Example I
[4]Cured 2 hr. at 100° C, 1 hr. at 130° C, 3 hr. at 150° C

EXAMPLES V–XIV

The following examples show the resins containing the additives in accordance with the instant invention are unexpectedly resistant to thermal shock. Resins prepared in Examples II-IV were tested for thermal shock resistance. Approximately 50 g samples were utilized to encapsulate washers (1 inch o.d., ⅜ inch i.d., 1/16 inch thick) supported by ¼ inch ring of filter paper cut from Whatham 19 × 19 mm. cellulose extraction thimble. The encapsulations were formed in aluminum milk test evaporating dishes (5 cm dia. × 1 cm deep). The results are shown in Table II below.

TABLE II

| Number of samples cracked during cycles[1] | 5 | 6 | 7 | 8 | 9 | 10 | 11 | 12 | 13 | 14 |
|---|---|---|---|---|---|---|---|---|---|---|
| Formulations | | | | | | | | | | |
| Example II | 6 | 1 | 3[2] | — | — | — | — | — | — | — |
| Example III | 4 | 3 | 0 | 0 | 0 | 0 | 0 | 0 | 0 | 0 |
| Example IV | 3 | 0 | 0 | 0 | 0 | 0 | 0 | 0 | 0 | 0 |

[1]Thermal cycle: oven at 160° C (30 mins.), bath at −40° C (15 mins.), room temperature (15 mins.). Examined for cracking and, if unchanged, recycled to oven.
[2]All 10 samples were cracked after cycle 3.

EXAMPLES XV–XVII

In these examples, epoxy resins were prepared in the same manner as those in Examples IV-V, substituting the polyoxypropylenepolyamine sold under the tradename "JEFFAMINE® D-2000" by Jefferson Chemical Co., Austin, Tex. 78751 for the diamide additive. These examples demonstrate that the heat deflection temperature is significantly lower when using the "JEFFAMINE® D-2000" additive as opposed to the polyether diamide termiated additive of the instant invention. Table III shows the formulations of Examples II-IV with their corresponding heat deflection temperature.

TABLE III

| Formulations | Examples 15 | 16 | 17 |
|---|---|---|---|
| Epoxide (Eq. 190) | 100 | 100 | 100 |
| Curing agent, pbw[1] | 85 | 85 | 85 |
| Accelerator, pbw[2] | 2.5 | 2.5 | 2.5 |
| Additive[3] | 0 | 10 | 20 |
| Properties of cured ⅛" unfilled castings[4] | | | |
| HDT, ° C, 264 psi/66 psi | 122/130 | 90.5/100 | 88/98 |

[1]"Nadic Methyl Anhydride" sold by Allied Chemical Corporation, Morristown, N. J. 07960
[2]"DMP-10" sold by Rohm and Haas, Philadelphia, Pa. 19105
[3]"JEFFAMINE® D-2000" sold by Jefferson Chemical, Austin, Texas 78751
[4]Cured as in Examples II-IV

EXAMPLE XVIII

In this example, a polyether bis(benzamide) additive was prepared. Using the equipment and procedures of Example I, 1330 g (0.696 mols) of a polyoxypropylenepolyamine having a molecular weight of approximately 2000, sold under the tradename "JEFFAMINE® D-2000 " by Jefferson Chemical Company, Austin, Tex. 78765, 170 g benzoic acid (1.393 moles) and 50 ml benzene were charged to a suitable reaction vessel. The resultant admixture was flushed with nitrogen and stirred under a nitrogen pad at reflux (156°–240° C) with continuous water removal (85% of theoretical). A vacuum was slowly applied over about a one hour period to facilitate the removal of the remainder of the water. The admixture was then stirred under vacuum (185° C/30 mm Hg) for an additional hour. Upon cooling, the light brown, viscous liquid reaction product was shown to consist substantially of the bis(benzamide) material.

EXAMPLE IXX

In this example, the unexpected selectivity of the additive of the instant invention is demonstrated. Using the bis(benzamide) prepared in Example XVIII as the additive, an anhydride cured formulation was prepared as shown in Table IV.

TABLE IV

| Formulation | Example 19 |
|---|---|
| Epoxy resin (Eq 190) | 100 |
| Curing agent, pbw[1] | 85 |
| Additive, pbw[2] | 20 |
| Accelerator[3] | 2.5 |
| Appearance of casting after cure[4] | Clear |

[1]"Nadic Methyl Anhydride" sold by Allied Chemical Corporation, Morristown, N. J. 07960
[2]Product of Example XVIII
[3]"DMP-10" sold by rohm and Haas, Philadelphia, Pa. 19105
[4]Cured 3 hr. at 125° C.

The clear appearance of the casting after cure indicates the absence of the improved properties obtained using the bis(formamide) additive in accordance with the instant invention.

While the invention has been explained in relation to its preferred embodiment, it is to be understood that various modifications thereof will become apparent to those skilled in the art upon reading the specification and is intended to cover such modifications as fall within the scope of the appended claims.

What is claimed is:

1. An epoxy resin composition having superior resistance to thermal shock and being the cured product of a curable admixture which comprises:
   a vicinal polyepoxide having an epoxide equivalency of greater than 1.8;
   a curing amount of an alkyl substituted dicarboxylic bicyclic vicinal anhydride curing agent; and,
   an effective amount of an additive consisting essentially of a polyether diamide having the formula

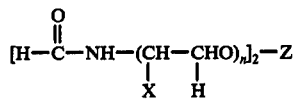

wherein X is hydrogen, a methyl radical or an ethyl radical; Z is a hydrocarbon alkylene radical having 2 to 5 carbon atoms and n is a number selected such that the molecule of the above formula has a molecular weight of from about 2000 to about 3000.

2. The composition of claim 1 wherein X is a methyl radical; Z is a 1,2-propylene radical; and n is an average number from 16 to 19.

3. The composition of claim 1 further comprising an effective amount of a composition effective in accelerating the cure.

4. The composition of claim 3 wherein said vicinal polyepoxide is more than 80% by weight of a polyglycidyl ether of polyhydric phenols; and wherein said composition effective in accelerating the cure comprises a dialkyl amine substituted aromatic.

5. The composition of claim 4 wherein said vicinal polyepoxide is a polyglycidyl ether of a polyhydric phenol; wherein said curing agent is methyl-bicyclo [2,2,1] heptene-2,3-dicarboxylic anhydride.

6. A method for increasing the resistance to thermal shock of an epoxy resin composition, being the cured product of a curable admixture comprising a vicinal polyepoxide having an epoxide equivalency of greater than 1.8; and, a curing amount of an alkyl substituted dicarboxylic bicyclic vicinal anhydride comprising the step of:
   adding to said curable admixture an effective amount of a polyether diamide additive having the formula

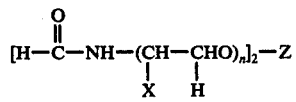

wherein X is hydrogen, a methyl radical or an ethyl radical; Z is a hydrocarbon alkylene radical having 2 to 5 carbon atoms and n is a number selected such that the molecule of the above formula has a molecular weight of from about 2000 to about 3000.

7. The method of claim 6 wherein X is a methyl radical; Z is a 1,2-propylene radical; and n is an average number from 16 to 19.

8. The method of claim 7 wherein said curable admixture further comprises an effective amount of a composition effective in accelerating the cure.

9. The method of claim 8 wherein said vicinal polyepoxide is more than 80% by weight of a polyglycidyl ether of polyhydric phenols; and wherein said composition effective in accelerating the cure comprises a dialkyl amine substituted aromatic.

10. The method of claim 9 wherein said vicinal polyepoxide is a polyglycidyl ether of a polyhydric phenol; wherein said methyl-bicyclo [2,2,1]heptene-2, 3-dicarboxylic anhydride.

11. A curable resin composition comprising a diglycidyl ether of 4,4'-isopropylidene bisphenol polyepoxide; a curing amount of a curing agent consisting essentially of methyl-bicyclo [2,2,1] heptene-2, 3-dicarboxylic anhydride, an accelerator of dimethylaminomethyl substituted phenol; and, an effective amount of a polyether diamide additive having the formula

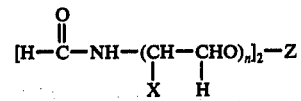

wherein X is hydrogen, a methyl radical or an ethyl radical; Z is a hydrocarbon alkylene radical having 2 to 5 carbon atoms and n is a number selected such that the molecule of the above formula has a molecular weight of from about 2000 to about 3000.

12. The resin of claim 11 wherein said curing agent is present in about 80 to about 90 parts by weight based on 100 parts resin, said accelerator is present in amount from about 1 to 5 parts by weight based on 100 parts by weight said polyepoxide, said additive is present in amount from about 5 to 35 parts by weight based on 100 parts by weight of said polyepoxide.

13. In an epoxy resin composition, being the cured product of a curable admixture comprising a vicinal polyepoxide having an epoxide equivalency greater than 1.8; and, a curing amount of an alkyl substituted dicarboxylic bicyclic vicinal anhydride curing agent, the improvement which comprises: increasing the resistance to thermal shock of said cured product by addition of an effective amount of a polyether diureide to the curable admixture, wherein said polyether diamide is of the formula

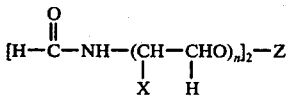

wherein X is hydrogen, a methyl radical or an ethyl radical; Z is a hydrocarbon alkylene radical having 2 to 5 carbon atoms and n is a number selected such that the molecule of the above formula has a molecular weight of from about 2000 to about 3000.

14. The method of claim 13 wherein X is a methyl radical; Z is a 1,2-propylene radical; and n is an average number from 16 to 19.

* * * * *